US011548806B2

(12) United States Patent
Toyosaki et al.

(10) Patent No.: US 11,548,806 B2
(45) Date of Patent: Jan. 10, 2023

(54) GLASS BODY MANUFACTURING APPARATUS, GLASS BODY MANUFACTURING METHOD, SOOT CONVEYING MECHANISM, AND SOOT HEATING MECHANISM

(71) Applicant: FURUKAWA ELECTRIC CO., LTD., Tokyo (JP)

(72) Inventors: Koichi Toyosaki, Tokyo (JP); Hiroshi Miyake, Tokyo (JP); Tsuneo Suzuki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 241 days.

(21) Appl. No.: 16/884,276

(22) Filed: May 27, 2020

(65) Prior Publication Data

US 2020/0283328 A1 Sep. 10, 2020

Related U.S. Application Data

(63) Continuation of application No. PCT/JP2018/044266, filed on Nov. 30, 2018.

(30) Foreign Application Priority Data

Dec. 1, 2017 (JP) .............................. JP2017-232138

(51) Int. Cl.
*C03B 37/014* (2006.01)
*C03B 37/018* (2006.01)
(Continued)

(52) U.S. Cl.
CPC .... *C03B 37/0146* (2013.01); *C03B 37/01807* (2013.01); *C03B 37/01884* (2013.01);
(Continued)

(58) Field of Classification Search
CPC .................................................. C03B 37/0146
See application file for complete search history.

(56) References Cited

U.S. PATENT DOCUMENTS

| | | | | |
|---|---|---|---|---|
| 4,664,690 A | * | 5/1987 | Kyoto | ............... C03B 37/01446 65/30.12 |
| 2015/0329403 A1 | * | 11/2015 | Adigrat | ................. C03B 37/027 65/508 |
| 2020/0031706 A1 | * | 1/2020 | Grieco | ................. C03B 37/0146 |

FOREIGN PATENT DOCUMENTS

| | | |
|---|---|---|
| CN | 105314830 A | 2/2016 |
| GB | 2 171 691 B | 6/1988 |

(Continued)

OTHER PUBLICATIONS

International Search Report dated Jan. 29, 2019 in PCT/JP2018/044266 filed Nov. 30, 2018, 1 page.

(Continued)

*Primary Examiner* — Cynthia Szewczyk
(74) *Attorney, Agent, or Firm* — Oblon, McClelland, Maier & Neustadt, L.L.P.

(57) ABSTRACT

A glass body manufacturing apparatus includes: a first heating furnace including a furnace core tube accommodating the soot and a first heater, to supply a dehydration gas into the furnace core tube and heat the soot at a first treatment temperature lower than a softening point of the porous portion by the first heater; a second heating furnace including a structural body accommodating the soot and a second heater, to heat the soot at a second treatment temperature equal to or higher than the softening point by the second heater; and a conveyance container, connectable to each of the first and second heating furnaces while keeping airtightness with respect to the atmosphere, to accommodate and hold the soot, and convey the soot between the first and second heating furnaces.

7 Claims, 11 Drawing Sheets

(51) Int. Cl.
*F27B 9/04* (2006.01)
*F27D 7/06* (2006.01)

(52) U.S. Cl.
CPC ............... *F27B 9/045* (2013.01); *F27D 7/06* (2013.01); *C03B 2201/06* (2013.01)

(56) References Cited

FOREIGN PATENT DOCUMENTS

| | | | | |
|---|---|---|---|---|
| JP | 61-270232 | A | 11/1986 | |
| JP | 2-217329 | A | 8/1990 | |
| JP | 3-109224 | A | 5/1991 | |
| JP | 4-325433 | A | 11/1992 | |
| JP | 9-286630 | A | 11/1997 | |
| JP | 9-286679 | A | 11/1997 | |
| JP | 2000-44269 | A | 2/2000 | |
| JP | 2002145628 | A * | 5/2002 | ....... C03B 37/01446 |
| JP | 2004-345869 | A | 12/2004 | |
| JP | 2006-45020 | A | 2/2006 | |
| JP | 2007-153708 | A | 6/2007 | |
| JP | 2010-222223 | A | 10/2010 | |

OTHER PUBLICATIONS

Combined Chinese Office Action and Search Report dated Mar. 17, 2022 in Chinese Patent Application No. 201880076296.1 (with unedited computer generated English translation), 15 pages.

* cited by examiner

GLASS BODY MANUFACTURING APPARATUS, GLASS BODY MANUFACTURING METHOD, SOOT CONVEYING MECHANISM, AND SOOT HEATING MECHANISM

CROSS-REFERENCE TO RELATED APPLICATION(S)

This application is based on a continuation of International Application No. PCT/JP2018/044266, filed on Nov. 30, 2018, which is based on Japanese Patent Application No. 2017-232138 filed in Japan on Dec. 1, 2017, the entire contents of which are incorporated herein by reference.

BACKGROUND

The present disclosure relates to a glass body manufacturing apparatus, a glass body manufacturing method, a soot conveying mechanism, and a soot heating mechanism.

Silica glass optical fibers are typically manufactured by drawing an optical fiber preform that is a glass body made of silica-based glass. To manufacture the optical fiber preform, for example, an outside vapor-phase deposition (OVD) method is used. When the OVD method is used, a soot is fabricated by depositing silica glass particles around the outer periphery of a target rod made of silica-based glass to form a porous portion in layers. The soot is then given a so-called dehydration treatment in which the soot is heated under a dehydration gas atmosphere in order to remove a hydroxyl group contained in the porous portion. The dehydration treatment is performed at a temperature lower than the softening point of the silica glass forming the soot. Subsequently, the soot is given a vitrification treatment in which the soot is heated at a temperature equal to or higher than the softening point. This removes holes existing within the porous portion, thereby converting the porous portion into transparent glass (appropriately referred to as transparent vitrification below).

The dehydration treatment and the vitrification treatment are performed in the same heating furnace or different heating furnaces. Additionally, the heating furnace typically includes a furnace core tube made of silica glass (see, for example, Japanese Laid-open Patent Publication No. 2004-345869 and Japanese Laid-open Patent Publication No. 2007-153708).

SUMMARY

There is a need for providing a glass body manufacturing apparatus, a glass body manufacturing method, a soot conveying mechanism, and a soot heating mechanism capable of preventing a decrease in operation rate and an increase in maintenance cost.

According to an embodiment, a glass body manufacturing apparatus for manufacturing a glass body by dehydrating and transparently vitrifying a soot having a porous portion, includes: a first heating furnace including a furnace core tube accommodating the soot and a first heater, the first heating furnace supplying a dehydration gas into the furnace core tube and heating the soot at a first treatment temperature, which is lower than a softening point of the porous portion, by the first heater; a second heating furnace including a structural body configured to accommodate the soot and a second heater, the second heating furnace heating the soot at a second treatment temperature, which is equal to or higher than the softening point, by the second heater; and a conveyance container connectable to each of the first heating furnace and the second heating furnace while keeping airtightness with respect to the atmosphere, the conveyance container being configured to accommodate and hold the soot, and convey the soot between the first heating furnace and the second heating furnace.

According to an embodiment, a glass body manufacturing method includes: in a first heating furnace, accommodating a soot having a porous portion in a furnace core tube made of glass, supplying a dehydration gas into the furnace core tube, and heating the soot at a first treatment temperature, which is lower than a softening point of the porous portion; connecting a conveyance container and the first heating furnace together while keeping airtightness with respect to the atmosphere, accommodating and holding the soot in the conveyance container, and conveying the soot to a second heating furnace; and connecting the conveyance container and the second heating furnace together while keeping airtightness with respect to the atmosphere, accommodating the soot in a structural body, and heating the soot at a second treatment temperature, which is equal to or higher than the softening point.

According to an embodiment, a soot conveying mechanism to convey a soot between a first heating furnace and a second heating furnace includes: a conveyance container accommodating the soot; and a moving mechanism moving the conveyance container to a position above the first heating furnace and a position above the second heating furnace. Further, the conveyance container includes: an operating mechanism capable of lifting and lowering the soot within the conveyance container, an airtight mechanism capable of making inside the conveyance container airtight, and a connection unit configured to be connectable to the first heating furnace or the second heating furnace.

According to an embodiment, a soot heating mechanism to convert a soot having a porous portion into a fiber preform includes: a first heating furnace including a furnace core tube accommodating the soot, a first heater, a first gas supply unit supplying a dehydration gas into the furnace core tube, and a first gas discharge unit discharging the dehydration gas, the first heating furnace heating the soot at a first treatment temperature, which is lower than a softening point of the porous portion, by the first heater under an atmosphere of the dehydration gas; and a second heating furnace including a structural body configured to accommodate the soot, a second heater, a second gas supply unit supplying an inert gas into the structural body, and a second gas discharge unit discharging the inert gas, the second heating furnace heating the soot at a second treatment temperature, which is equal to or higher than the softening point, by the second heater under an atmosphere of the inert gas.

DETAILED DESCRIPTION

In the related art, since the vitrification treatment is performed at a temperature equal to or higher than the softening point, the furnace core tube made of silica glass may soften to be deformed or devitrified. It is necessary to perform maintenance by, for example, replacing the furnace core tube if the furnace core tube is deformed or devitrified, resulting in a decrease in operation rate of the heating furnace and an entire glass body manufacturing apparatus including the heating furnace, and an increase in maintenance cost thereof.

Meanwhile, the dehydration treatment and the vitrification treatment can be performed in different heating furnaces. In this case, for example, a method of performing the vitrification treatment in a heating furnace including a furnace core tube having heat resisting properties at the vitrification treatment temperature can be employed. However, this method may cause the atmosphere to flow into a dehydration heating furnace for performing the dehydration treatment when the soot is transferred from the dehydration heating furnace to a vitrification heating furnace for performing the vitrification treatment. If the atmosphere flows into the dehydration heating furnace, moisture in the atmosphere and a dehydration gas may react with each other to generate a corrosive substance, which may damage the dehydration heating furnace. Additionally, the corrosive substance may adhere to the soot to be conveyed to the vitrification heating furnace together with the soot. Moreover, the corrosive substance generated in the dehydration heating furnace may leak to the outside, or the dehydration gas may leak and react with moisture in the atmosphere to generate a corrosive substance outside the dehydration heating furnace, thus damaging the dehydration heating furnace and other facilities.

In the following, an embodiment of the present disclosure will be described with reference to the accompanied drawings. Note that the embodiment does not limit the disclosure. Additionally, in description of the drawings, the same or corresponding elements are denoted by the same reference numerals as appropriate.

Figure 1:
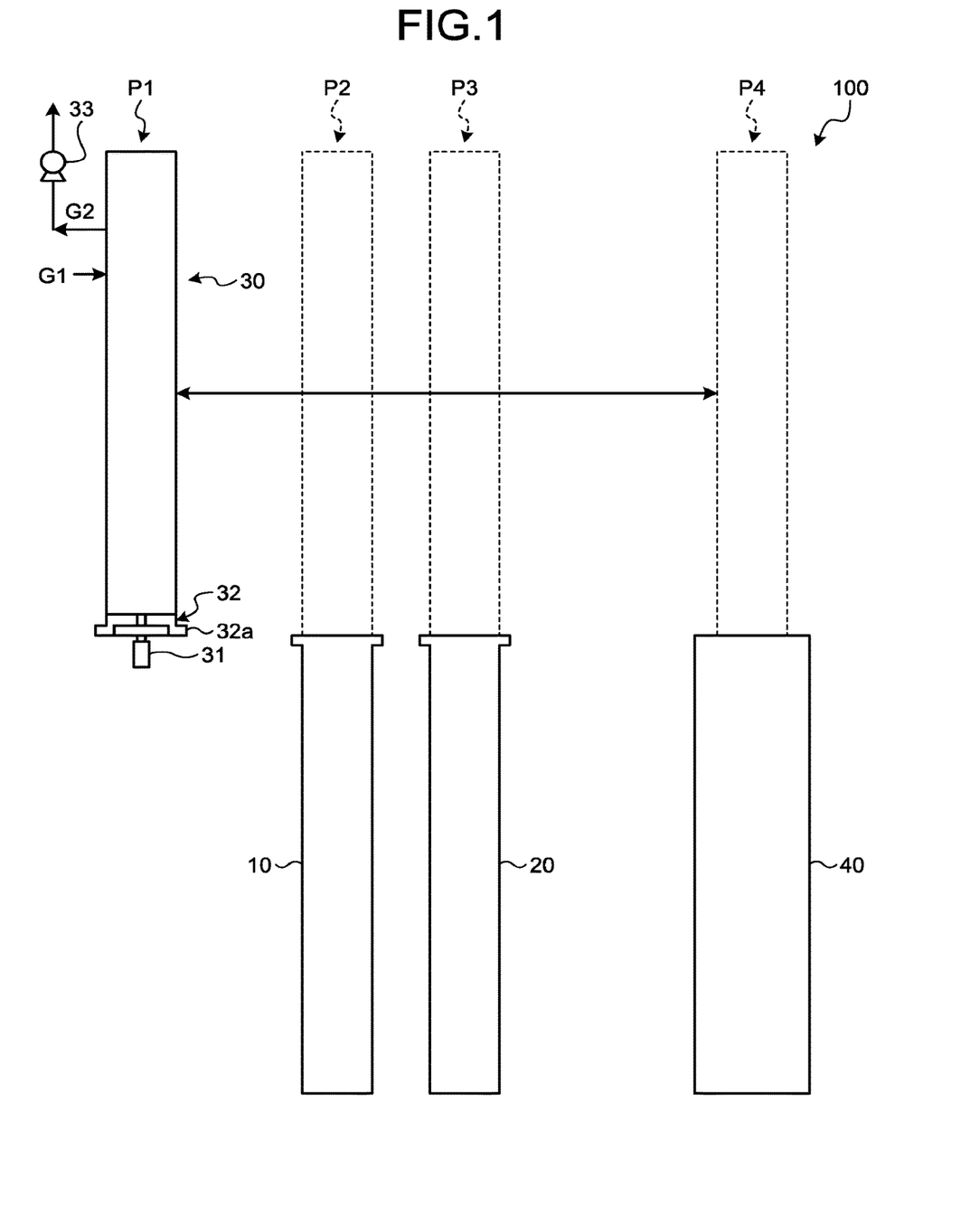
FIG. 1 is a schematic view illustrating a configuration of a glass body manufacturing apparatus according to an embodiment.

FIG. 1 is a schematic view illustrating a configuration of a glass body manufacturing apparatus according to the embodiment. A manufacturing apparatus 100 includes at least a dehydration heating furnace 10 serving as a first heating furnace, a vitrification heating furnace 20 serving as a second heating furnace, a conveyance chamber 30 serving as a conveyance container, and a storage 40.

First, the conveyance chamber 30 will be described. The conveyance chamber 30 is made of, for example, a metal such as stainless steel, and includes an operating mechanism 31, a connection unit 32, and a discharge pump 33. The conveyance chamber 30 is also configured to be freely movable to a position P1, a position P2 above the dehydration heating furnace 10, a position P3 above the vitrification heating furnace 20, and a position P4 above the storage 40 by an unillustrated moving mechanism.

The operating mechanism 31 is configured to be liftable and lowerable within the conveyance chamber 30. The operating mechanism 31 will be described in detail later.

The connection unit 32 is disposed at one end of the conveyance chamber 30, and includes a flange 32a. The connection unit 32 also includes a shut-off mechanism such as a shutoff valve constituting an airtight mechanism capable of making the inside of the conveyance chamber 30 airtight.

Additionally, a gas supply unit supplies a gas G1 that is an inert gas (e.g., nitrogen gas) into the conveyance chamber 30. The discharge pump 33 also discharges a gas inside the conveyance chamber 30 as a gas G2 to an exhaust gas treatment apparatus such as a scrubber.

Figure 2A:
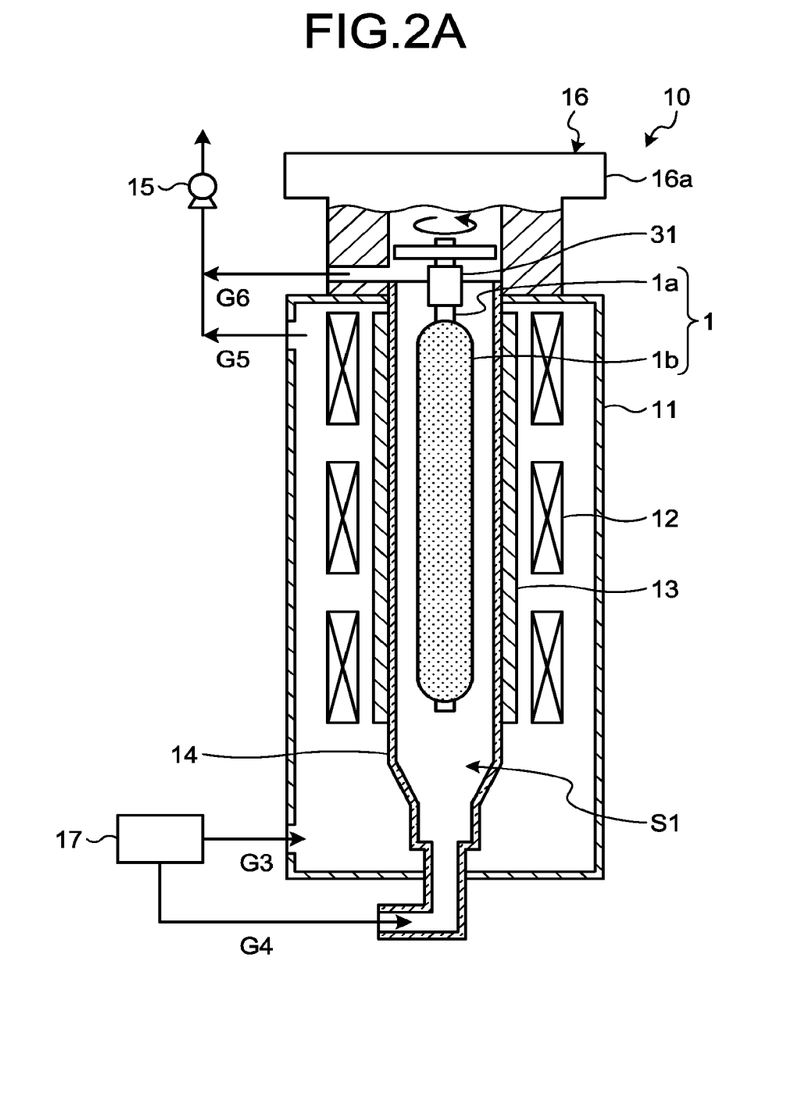
FIG. 2A is a schematic view illustrating a configuration of a dehydration heating furnace.
Figure 2B:
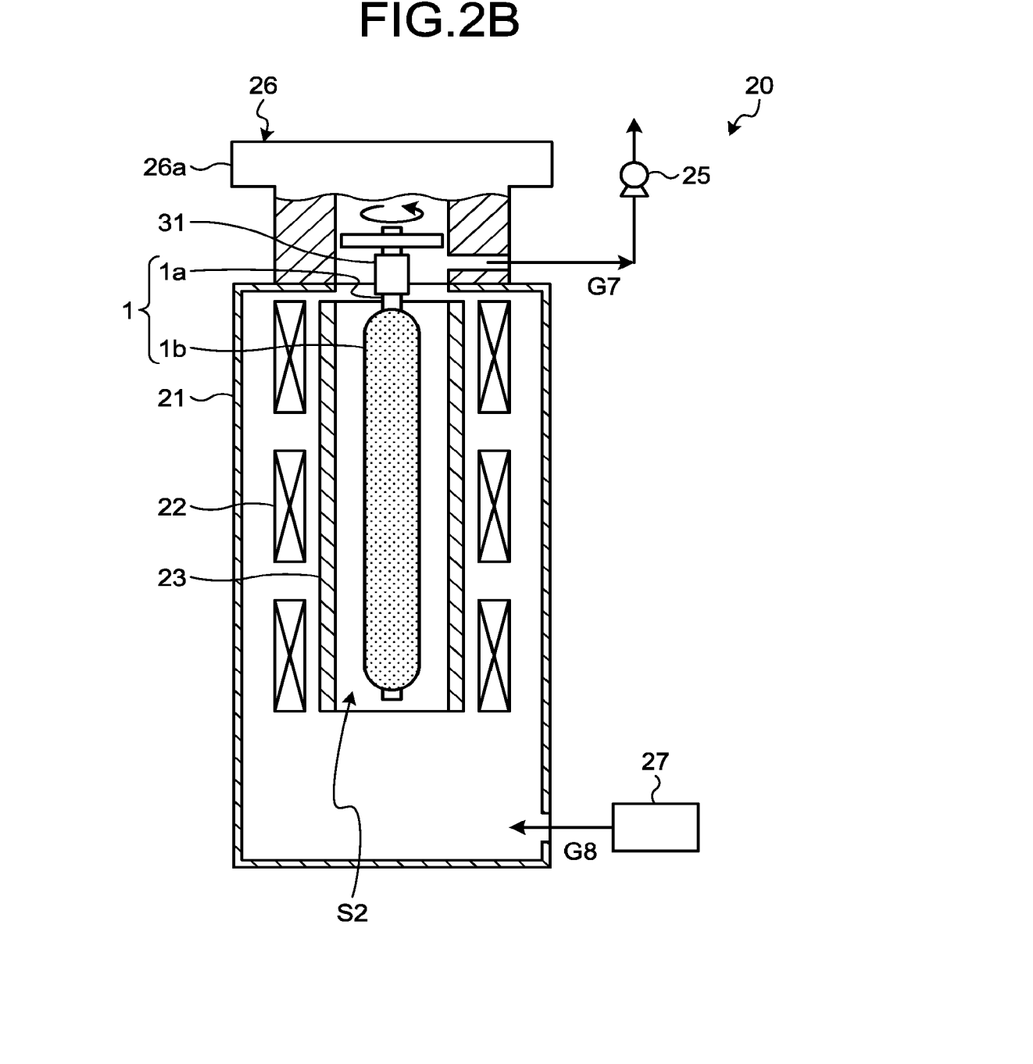
FIG. 2B is a schematic view illustrating a configuration of a vitrification heating furnace.

Next, the configuration of the dehydration heating furnace 10 and the configuration of the vitrification heating furnace 20 will be described with reference to FIGS. 2A and 2B, respectively. The dehydration heating furnace 10 illustrated in FIG. 2A is a heating furnace for giving a dehydration treatment to a soot 1. The vitrification heating furnace 20 illustrated in FIG. 2B is a heating furnace for giving a vitrification treatment to the soot 1 that has been given the dehydration treatment to obtain an optical fiber preform that is a glass body. The dehydration heating furnace 10 and the vitrification heating furnace 20 constitute a soot heating mechanism for heating the soot 1. The soot 1 includes a glass rod 1a and a porous portion 1b formed around the outer periphery of the glass rod 1a. For the glass rod 1a, dummy rods made of silica glass are connected to opposite ends of a core preform of silica-based glass including a core portion and a cladding portion formed around the outer periphery of the core portion. The porous portion 1b is integrated with the cladding portion of the core preform after the vitrification treatment to form a cladding portion of the optical fiber preform. For the soot 1, the glass rod 1a is obtained by connecting the glass rods to the core preform vitrified after being fabricated by, for example, a vapor-phase axial deposition (VAD) method, and the porous portion 1b is formed around the outer periphery of the glass rod 1a by an OVD method.

As illustrated in FIG. 2A, the dehydration heating furnace 10 includes at least a furnace body 11, heaters 12 serving as a first heater, a muffle tube 13, a furnace core tube 14, and a discharge pump 15. The dehydration heating furnace 10 heats the soot 1 at a first treatment temperature lower than the softening point of the porous portion 1b to dehydrate the soot 1.

The furnace body 11 accommodates the heaters 12, the muffle tube 13, the furnace core tube 14, and an unillustrated heat insulating member, and is made of, for example, a metal such as stainless steel. The heaters 12 are arranged at a plurality of positions along the longitudinal direction of the furnace core tube 14 so as to surround the outer periphery of the furnace core tube 14, and are made of, for example, a carbon material such as graphite. The muffle tube 13 is arranged so as to surround the furnace core tube 14 between the heaters 12 and the furnace core tube 14. The heat insulating member is arranged as appropriate so as to surround the outer peripheries of the heaters 12, the muffle tube 13, and the furnace core tube 14, and is made of, for example, a carbon material such as graphite. The furnace core tube 14 is made of silica glass and is configured to be able to accommodate the soot 1 in an internal space S1.

In the dehydration treatment, a gas supply unit 17 serving as a first gas supply unit supplies a gas G3 that is an inert gas (e.g., nitrogen gas) to an area outside the furnace core tube 14 within the furnace body 11. The gas supply unit 17 also supplies a gas G4 that is a mixed gas of an inert gas (e.g., nitrogen gas) and a dehydration gas (e.g., chlorine gas, fluorine, and thionyl chloride ($SOCl_2$)) into the furnace core tube 14. The discharge pump 15 serving as a first gas discharge unit discharges a gas outside the furnace core tube 14 within the furnace body 11 and a gas inside the furnace core tube 14 as a gas G5 and a gas G6, respectively, to an exhaust gas treatment apparatus such as a scrubber.

A connection unit 16 configured to be connectable to the connection unit 32 of the conveyance chamber 30 is also disposed in an upper portion of the dehydration heating furnace 10. The connection unit 16 includes a flange 16a connectable to the flange 32a of the connection unit 32. The connection unit 16 further includes a shut-off mechanism (not illustrated) such as a shutoff valve capable of making the insides of the furnace body 11 and the furnace core tube 14 of the dehydration heating furnace 10 airtight against the atmosphere. The connection unit 16 is connectable to the connection unit 32 of the conveyance chamber 30 while keeping airtightness with respect to the atmosphere. Note that a sealing mechanism may be provided in order to surely achieve the airtightness with respect to the atmosphere. Connecting and fastening the connection unit 16 and the connection unit 32 together by use of the flanges 16a and 32a and opening the respective shut-off mechanisms enable the soot 1 and the operating mechanism 31 to move between the conveyance chamber 30 and the dehydration heating furnace 10 through the shut-off mechanisms. The connection unit 16 is configured to be able to hold the operating mechanism 31 moving from the conveyance chamber 30. The operating mechanism 31 operates the soot 1 so as to rotate around the center axis of the glass rod 1a of the soot 1 by grasping one end of the glass rod 1a in the dehydration heating furnace 10. Note that a mechanism for rotating the operating mechanism 31 may be disposed inside the dehydration heating furnace 10, or outside the dehydration heating furnace 10 as long as the insides of the furnace body 11 and the furnace core tube 14 can be made airtight against the atmosphere.

As illustrated in FIG. 2B, the vitrification heating furnace 20 includes at least a furnace body 21, heaters 22 serving as a second heater, a muffle tube 23, and a discharge pump 25 such as an evacuation pump. The vitrification heating furnace 20 heats the soot 1 at a second treatment temperature equal to or higher than the softening point of the porous portion 1b to transparently vitrify the porous portion 1b.

The furnace body 21 accommodates the heaters 22, the muffle tube 23, and a heat insulating member (not illustrated), and is made of, for example, a metal such as stainless steel. The heaters 22 are made of, for example, a carbon material such as graphite. The muffle tube 23 serving as a structural body is arranged on the inner peripheral side of the heaters 22 so as to accommodate the soot 1 in an internal space S2. The heat insulating member is arranged as appropriate so as to surround the outer peripheries of the heaters 22 and the muffle tube 23. The muffle tube 23 and the heat insulating member are made of a material having heat resisting properties at the second treatment temperature, and are made of, for example, a carbon material such as graphite. Here, having heat resisting properties at the second treatment temperature means that the muffle tube 23 and the heating insulating member maintain such mechanical properties as not to be deformed at the second treatment temperature.

In the vitrification treatment, the discharge pump 25 serving as a second gas discharge unit discharges a gas inside the furnace body 21 as a gas G7 to an exhaust gas treatment apparatus such as a scrubber. A gas supply unit 27 serving as a second gas supply unit also introduces a gas G8 for, for example, returning an internal pressure to a predetermined pressure into the furnace body 21.

A connection unit 26 configured to be connectable to the connection unit 32 of the conveyance chamber 30 is also disposed in an upper portion of the vitrification heating furnace 20. The connection unit 26 includes a flange 26a connectable to the flange 32a of the connection unit 32. The connection unit 26 further includes a shut-off mechanism (not illustrated) such as a shutoff valve capable of making the inside of the furnace body 21 of the vitrification heating furnace 20 airtight against the atmosphere. The connection unit 26 is connectable to the connection unit 32 of the conveyance chamber 30 while keeping airtightness with respect to the atmosphere. Note that a sealing mechanism may be provided in order to surely achieve the airtightness with respect to the atmosphere. Connecting and fastening the connection unit 26 and the connection unit 32 together by use of the flanges 26a and 32a and opening the respective shut-off mechanisms enable the soot 1 and the operating mechanism 31 to move between the conveyance chamber 30 and the vitrification heating furnace 20 through the shut-off mechanisms. The connection unit 26 is configured to be able to hold the operating mechanism 31 moving from the conveyance chamber 30. The operating mechanism 31 operates the soot 1 so as to rotate around the center axis of the glass rod 1a of the soot 1 by grasping one end of the glass rod 1a in the vitrification heating furnace 20. Note that a mechanism for rotating the operating mechanism 31 may be disposed inside the vitrification heating furnace 20, or outside the vitrification heating furnace 20 as long as the inside of the furnace body 21 can be made airtight against the atmosphere.

The storage 40 slowly cools and stores the optical fiber preform produced by dehydrating and vitrifying the soot 1. Note that the storage 40 may be configured as a second vitrification heating furnace.

(Manufacturing Method)

Figure 3:
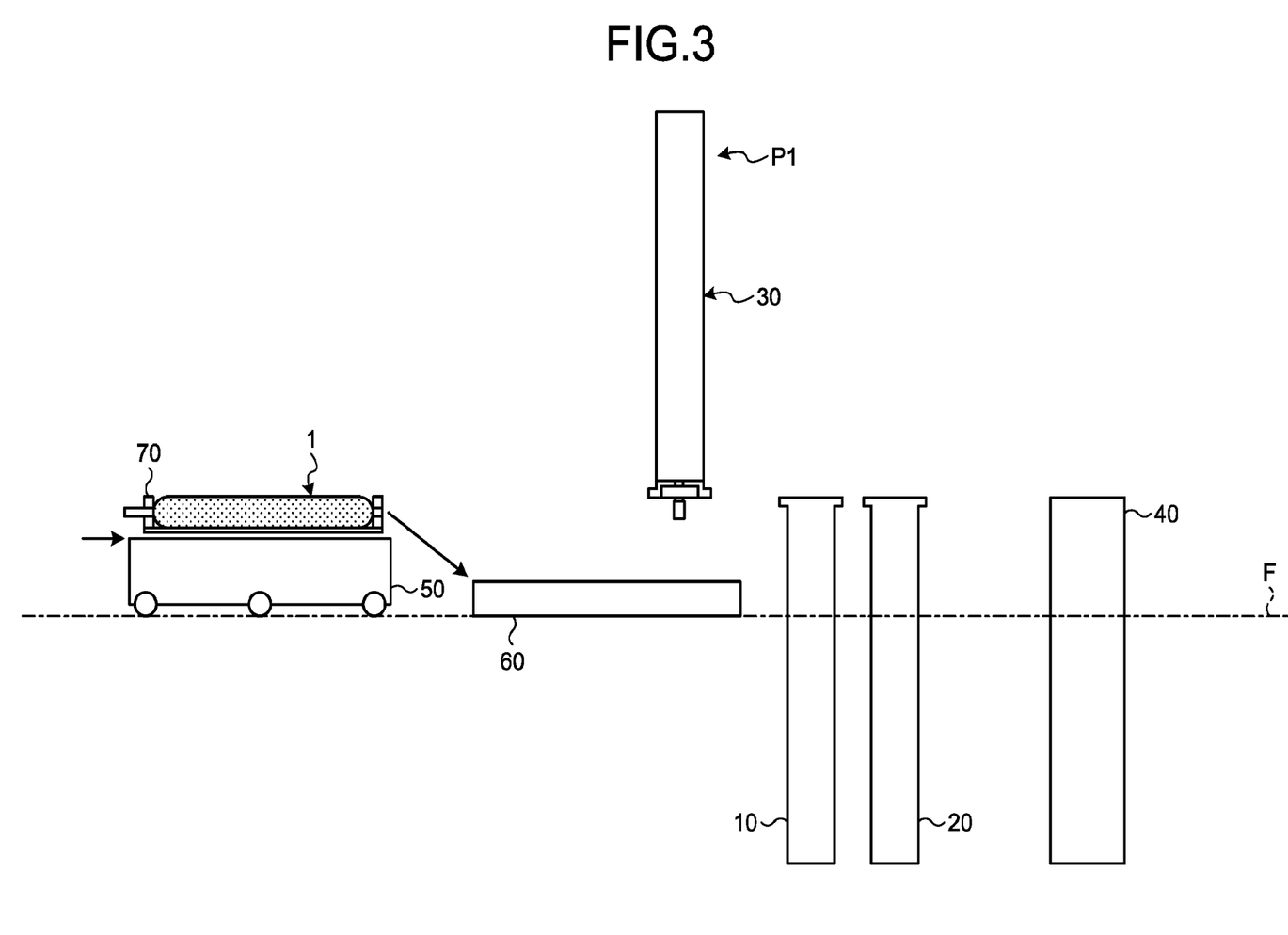
FIG. 3 is a schematic view illustrating a glass body manufacturing method.

Next, a method for manufacturing an optical fiber preform by using the manufacturing apparatus 100 will be described with reference to FIGS. 3 to 10. First, as illustrated in FIG. 3, the fabricated soot 1 is mounted on a truck 50 that is a transport apparatus. The truck 50 travels on a floor F to transport the soot 1 to a rotating mechanism 60 positioned near the manufacturing apparatus 100. Here, the soot 1 is transported in a state held by a holder 70 in order to prevent damage or the like. Also, the conveyance chamber 30 is positioned at the position P1.

Figure 4:
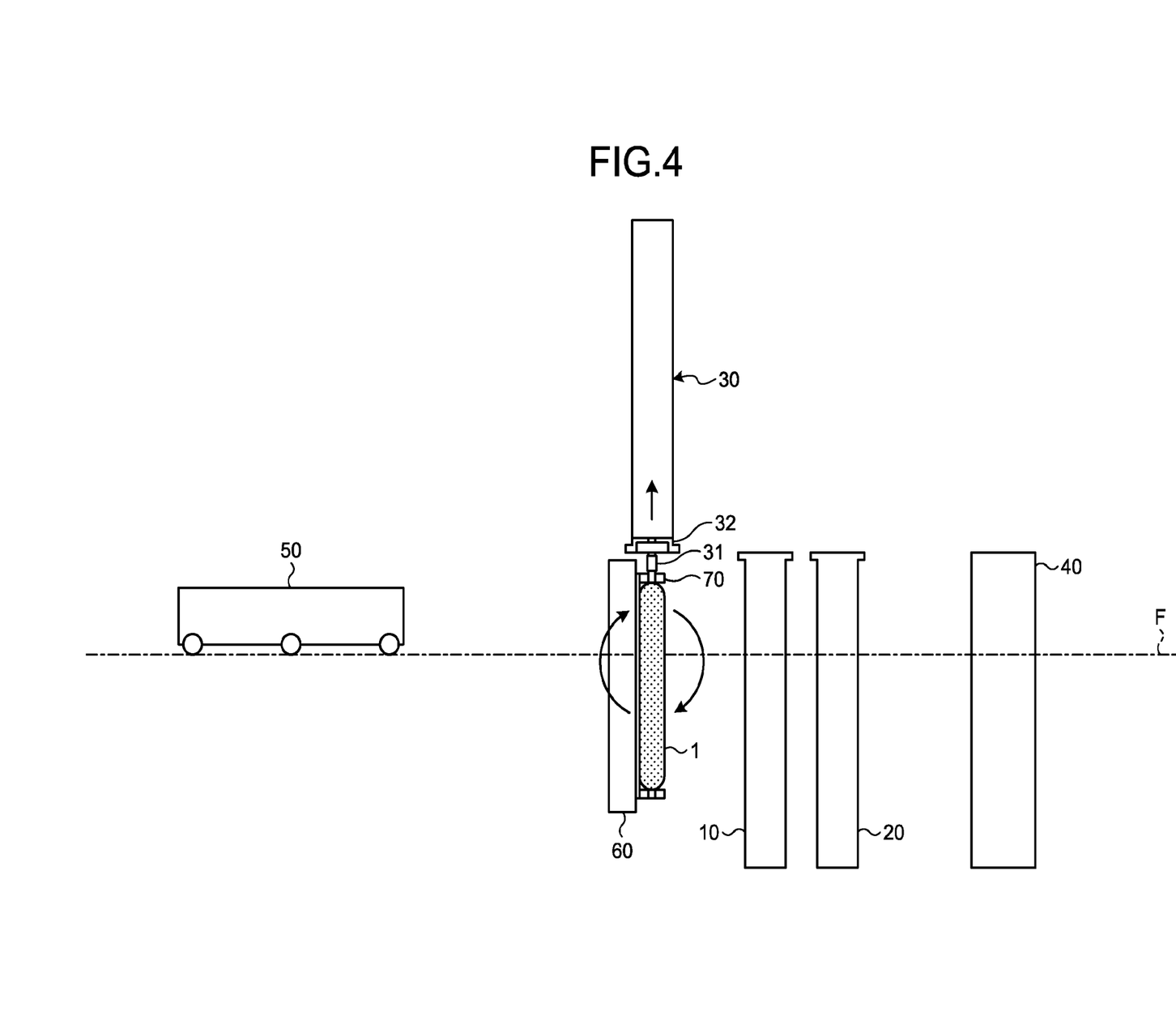
FIG. 4 is a schematic view illustrating the glass body manufacturing method.

Subsequently, as illustrated in FIG. 4, the rotating mechanism 60 rotates the soot 1 held by the holder 70 into an erected position such that opposite ends of the glass rod 1a are arranged on the top and bottom. The shut-off mechanism of the connection unit 32 is then opened, and the operating mechanism 31 of the conveyance chamber 30 grasps one end of the glass rod 1a of the soot 1 to lift the soot 1. The soot 1 is thereby accommodated and held in the conveyance chamber 30. The shut-off mechanism of the connection unit 32 is closed after accommodating the soot 1, making the inside of the conveyance chamber 30 airtight. The gas G1 (e.g., inert gas) is then supplied into the conveyance chamber 30 to obtain a predetermined atmosphere with the discharge pump 33 discharging the atmosphere inside the conveyance chamber 30. Meanwhile, the inside of the furnace core tube 14 of the dehydration heating furnace 10 is also brought into an inert gas atmosphere. Here, a dry atmosphere is preferably employed. The dry atmosphere is an atmosphere containing a sufficiently small amount of moisture or no moisture. Alternatively, the insides of the conveyance chamber 30 and the furnace core tube 14 may be depressurized.

Figure 5:
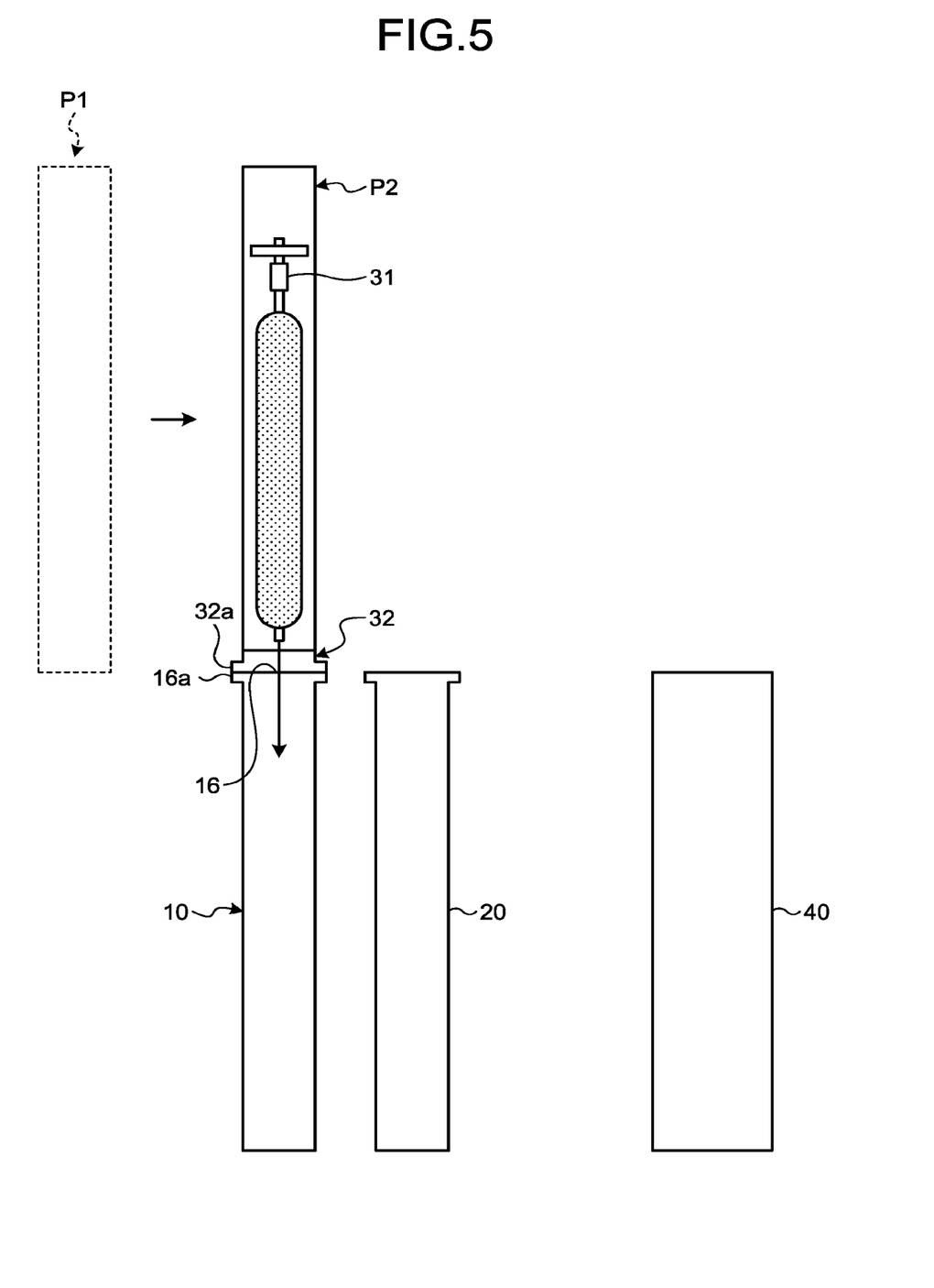
FIG. 5 is a schematic view illustrating the glass body manufacturing method.

Subsequently, as illustrated in FIG. 5, the conveyance chamber 30 moves from the position P1 to the position P2. The connection unit 32 of the conveyance chamber 30 and the connection unit 16 of the dehydration heating furnace 10 are connected together by the flanges 16a and 32a and the sealing mechanism while keeping the airtightness with respect to the atmosphere. Note that a flange member may be interposed as a joint between the connection unit 32 and the connection unit 16, and a discharge pump or a gas introduction mechanism connected to the flanges may depressurize the inside of the flange member or replace the inside of the flange member with an inert gas. After that, the respective shut-off mechanisms of the connection unit 32 and the connection unit 16 are opened, bringing the insides of the conveyance chamber 30 and the furnace core tube 14 of the dehydration heating furnace 10 into communication with each other while keeping the airtightness with respect to the atmosphere. Subsequently, the operating mechanism 31 lowers the soot 1 to guide the soot 1 into the dehydration heating furnace 10. The operating mechanism 31 also enters the dehydration heating furnace 10 to be held by the connection unit 16. After the soot 1 is guided and accommodated in the furnace core tube 14 and the operating mechanism 31 is held by the connection unit 16, the respective shut-off mechanisms of the connection unit 32 and the connection unit 16 are closed. The conveyance chamber 30 and the dehydration heating furnace 10 are then disconnected from each other. The soot 1 is guided into the dehydration heating furnace 10 from the conveyance chamber 30 without being exposed to the atmosphere as described above.

Figure 6:
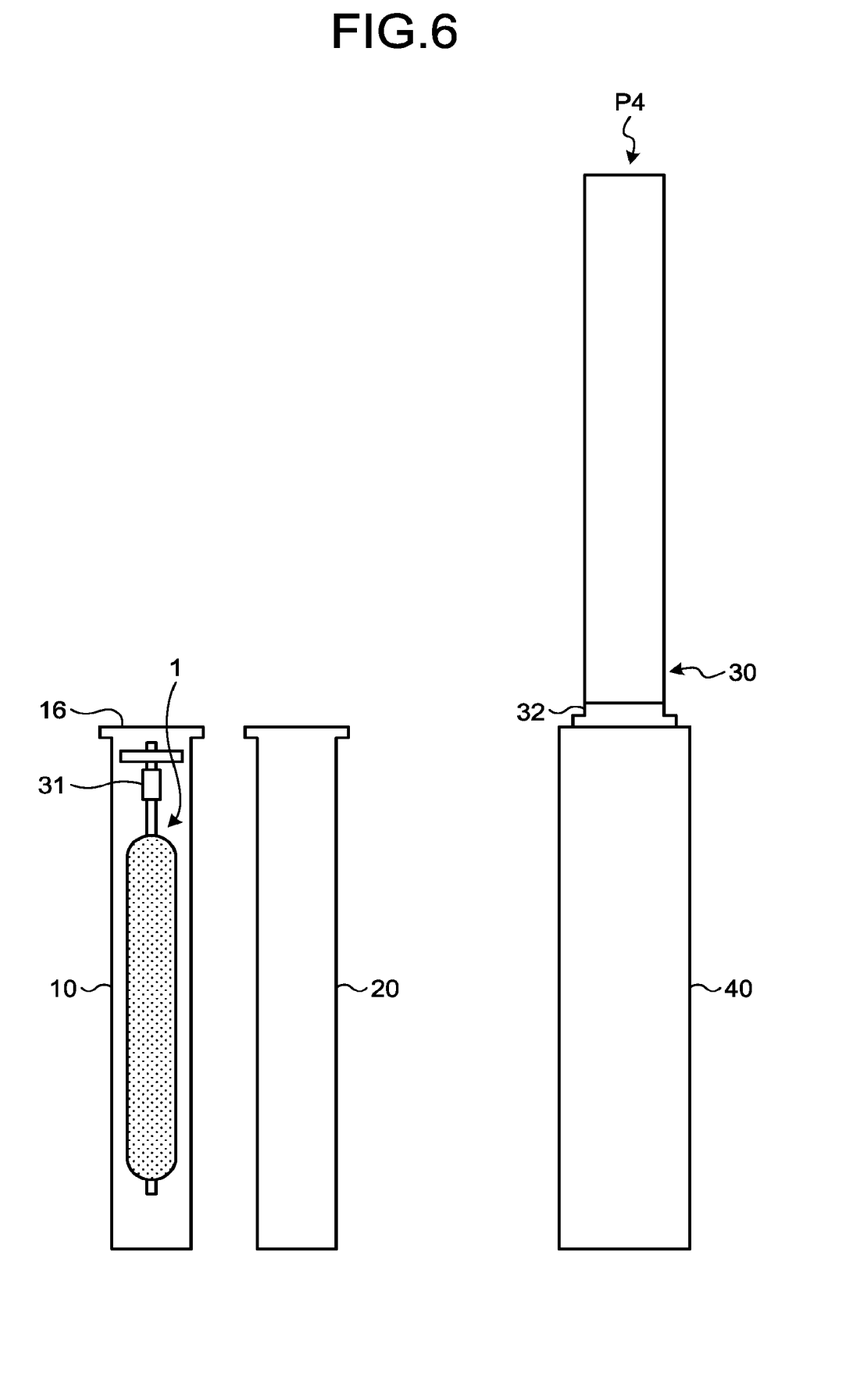
FIG. 6 is a schematic view illustrating the glass body manufacturing method.

Subsequently, as illustrated in FIG. 6, the dehydration heating furnace 10 heats the soot 1 that is rotated by the operating mechanism 31 at the first treatment temperature for a predetermined length of time by the heaters 12 to dehydrate the soot 1. In the dehydration treatment, the gas G3 and the gas G4 are supplied. The first temperature is, for example, a temperature between 1100° C. and 1250° C. Although the pressure of the gas G4 in the furnace core tube 14 is set to, for example, atmospheric pressure, the gas G4 may be also in a depressurized state or in a pressurized state slightly higher than the atmospheric pressure. Note that the dehydration treatment may be performed in two stages. In this case, for example, the soot 1 may be first heated at 1100° C. for a predetermined length of time as a first dehydration treatment, and then heated at 1250° C. for a predetermined length of time as a second dehydration treatment. The conveyance chamber 30 moves to, for example, the position P4 to be set to a standby state during the dehydration treatment.

Figure 7:
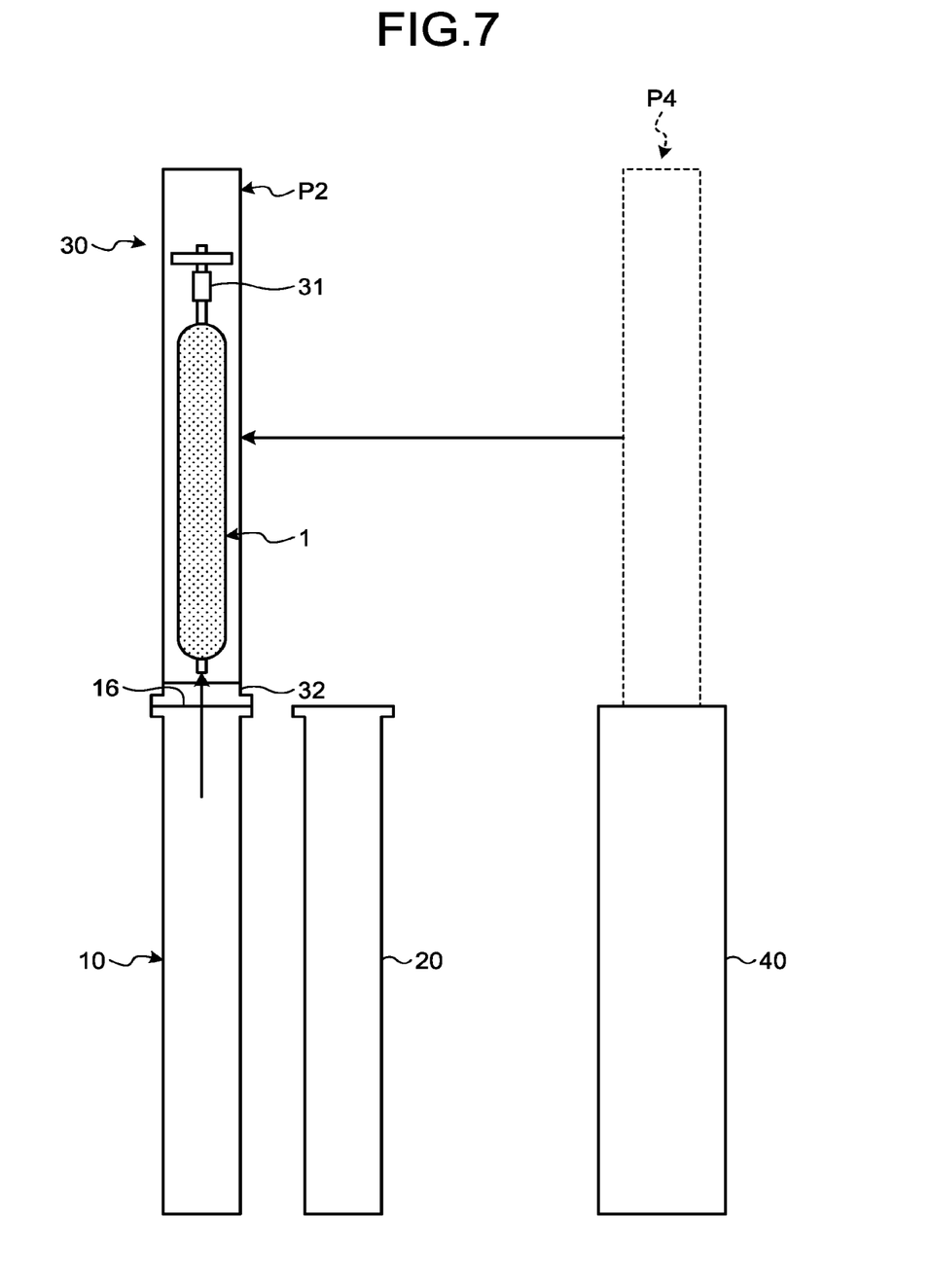
FIG. 7 is a schematic view illustrating the glass body manufacturing method.

When the dehydration treatment is finished, the conveyance chamber 30 moves to the position P2, and the connection unit 32 of the conveyance chamber 30 and the connection unit 16 of the dehydration heating furnace 10 are connected together while keeping the airtightness with respect to the atmosphere as illustrated in FIG. 7. The respective shut-off mechanisms of the connection unit 32 and the connection unit 16 are then opened, bringing the insides of the conveyance chamber 30 and the furnace core tube 14 of the dehydration heating furnace 10 into communication with each other while keeping the airtightness with respect to the atmosphere. Subsequently, the operating mechanism 31 grasping the dehydrated soot 1 moves to lift within the conveyance chamber 30, guiding the soot 1 into the conveyance chamber 30. After the soot 1 is guided and accommodated in the conveyance chamber 30, the respective shut-off mechanisms of the connection unit 32 and the connection unit 16 are closed. The conveyance chamber 30 and the dehydration heating furnace 10 are then disconnected from each other. Note that the inside of the conveyance chamber 30 is set to atmospheric pressure under the inert gas dry atmosphere or is depressurized before accommodating the dehydrated soot 1.

Thus, the dehydration gas contained in the gas G4 inside the furnace core tube 14 of the dehydration heating furnace 10 is prevented from being exposed to the atmosphere. As a result, the dehydration gas is prevented from reacting with moisture in the atmosphere to generate a corrosive substance. For example, when the dehydration gas is chlorine gas, hydrochloric acid is generated as the corrosive substance. Consequently, the dehydration heating furnace 10, the vitrification heating furnace 20, and other facilities of the manufacturing apparatus 100 are not damaged by the corrosive substance, thereby preventing a decrease in operation rate of the manufacturing apparatus 100 and an increase in maintenance cost thereof.

Figure 8:
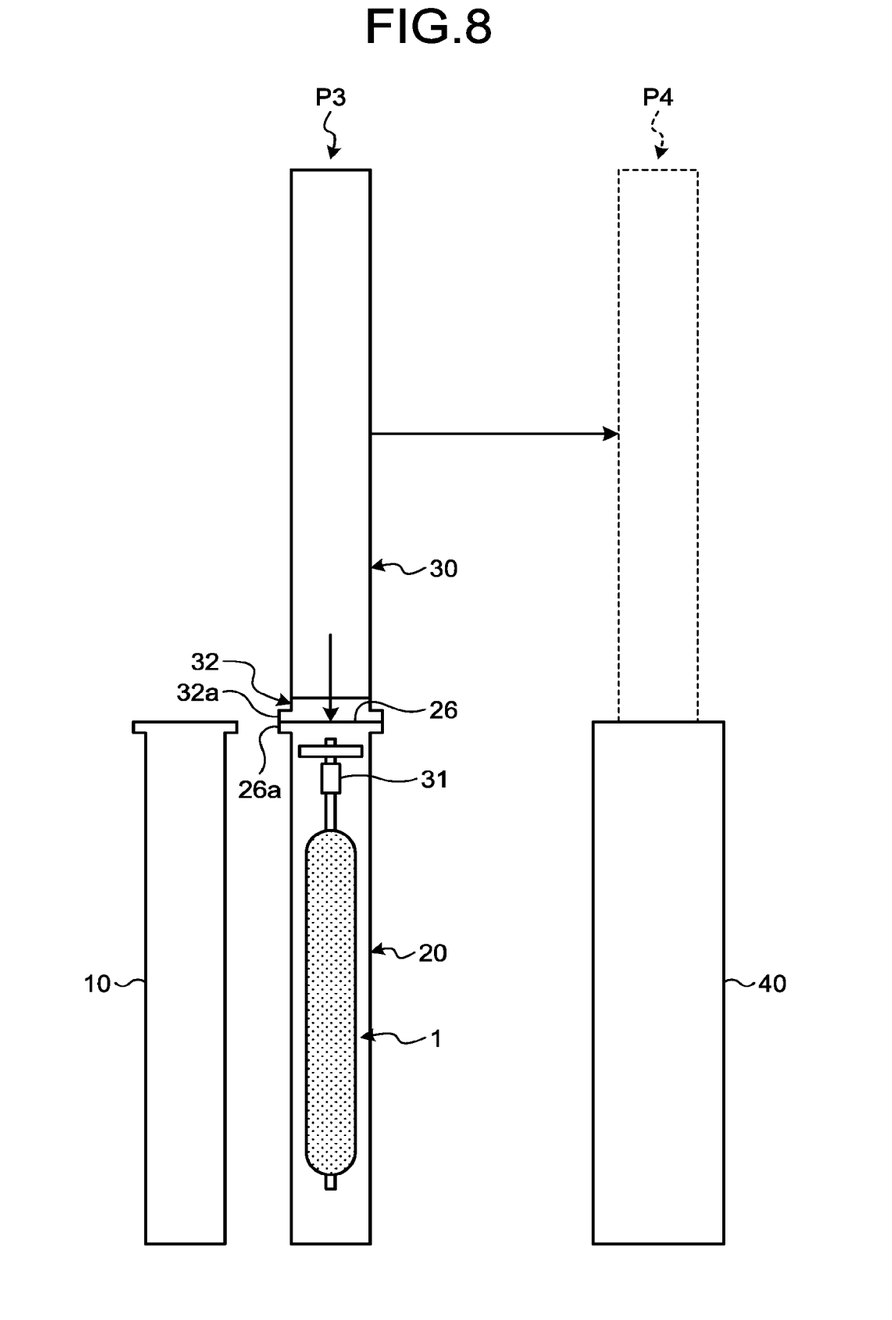
FIG. 8 is a schematic view illustrating the glass body manufacturing method.

Subsequently, as illustrated in FIG. 8, the conveyance chamber 30 moves to the position P3. The connection unit 32 of the conveyance chamber 30 and the connection unit 26 of the vitrification heating furnace 20 are connected together by the flanges 26a and 32a and the sealing mechanism while keeping the airtightness with respect to the atmosphere. Note that a flange member may be interposed as a joint between the connection unit 32 and the connection unit 26, and a discharge pump or a gas introduction mechanism connected to the flanges may depressurize the inside of the flange member or replace the inside of the flange member with an inert gas. After that, the respective shut-off mechanisms of the connection unit 32 and the connection unit 26 are opened, bringing the inside of the conveyance chamber 30 and the internal space S2 of the vitrification heating furnace 20 into communication with each other while keeping the airtightness with respect to the atmosphere. Subsequently, the operating mechanism 31 lowers the soot 1 to guide the soot 1 into the vitrification heating furnace 20. The operating mechanism 31 also enters the vitrification heating furnace 20 to be held by the connection unit 26. After the soot 1 is guided and accommodated in the internal space S2 and the operating mechanism 31 is held by the connection unit 26, the respective shut-off mechanisms of the connection unit 32 and the connection unit 26 are closed. The conveyance chamber 30 and the vitrification heating furnace 20 are then disconnected from each other. The soot 1 is guided into the vitrification heating furnace 20 from the conveyance chamber 30 without being exposed to the atmosphere as described above. The conveyance chamber 30 and the moving mechanism constitute a soot conveying mechanism for conveying the soot 1 between the dehydration heating furnace 10 and the vitrification heating furnace 20 as described above.

Subsequently, the vitrification heating furnace 20 heats the soot 1 that is rotated by the operating mechanism 31 at the second treatment temperature for a predetermined length of time by the heaters 22 to transparently vitrify the porous portion 1b. The second temperature is, for example, 1400° C. The inside of the vitrification heating furnace 20 is depressurized to, for example, a pressure lower than the atmospheric pressure. Alternatively, the transparent vitrification treatment may be performed by supplying an inert gas into the vitrification heating furnace 20 and heating the soot 1 under the atmospheric pressure in the vitrification treatment. The conveyance chamber 30 moves to, for example, the position P4 to be set to a standby state during the vitrification treatment.

Figure 9:
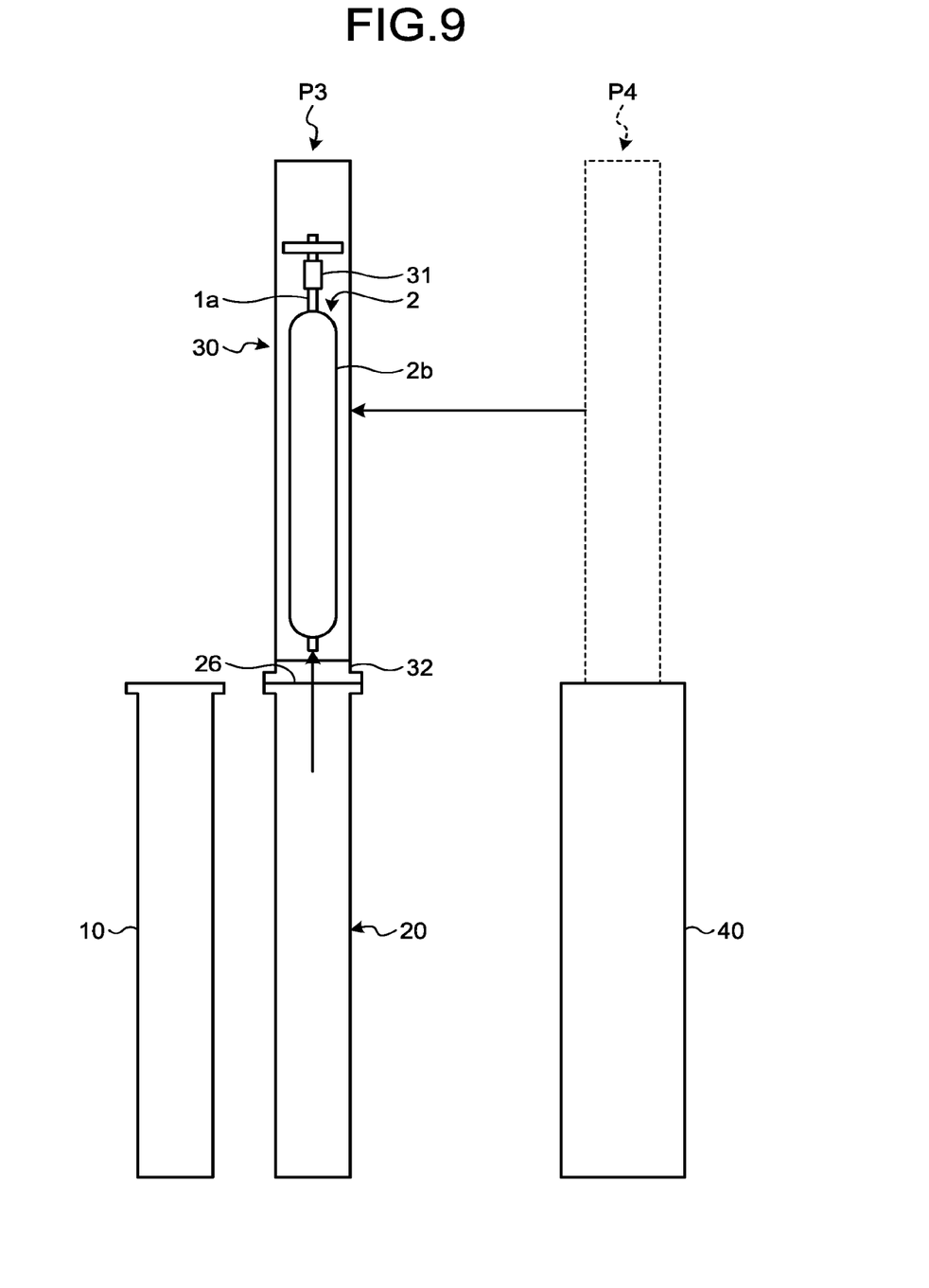
FIG. 9 is a schematic view illustrating the glass body manufacturing method.

When the vitrification treatment is finished, the conveyance chamber 30 moves to the position P3, and the connection unit 32 of the conveyance chamber 30 and the connection unit 26 of the vitrification heating furnace 20 are connected together while keeping the airtightness with respect to the atmosphere as illustrated in FIG. 9. The respective shut-off mechanisms of the connection unit 32 and the connection unit 26 are then opened, bringing the inside of the conveyance chamber 30 and the internal space S2 of the vitrification heating furnace 20 into communication with each other while keeping the airtightness with respect to the atmosphere. Subsequently, the operating mechanism 31 grasping an optical fiber preform 2 obtained after the vitrification treatment moves to lift within the conveyance chamber 30, thereby guiding the optical fiber preform 2 into the conveyance chamber 30. Note that the optical fiber preform 2 includes the glass rod 1a and a glass portion 2b formed around the outer periphery of the glass rod 1a. The glass portion 2b is obtained by transparently vitrifying the porous portion 1b. After the optical fiber preform 2 is guided and accommodated in the conveyance chamber 30, the respective shut-off mechanisms of the connection unit 32 and the connection unit 26 are closed. The conveyance chamber 30 and the vitrification heating furnace 20 are then disconnected from each other.

That is, when the soot 1 or the optical fiber preform 2 is moved between the conveyance chamber 30 and the dehydration heating furnace 10 or the vitrification heating furnace 20, the soot 1 or the optical fiber preform 2 is always moved under the inert atmosphere or in the depressurized state, and thus not exposed to the atmosphere.

Here, the vitrification heating furnace 20 includes no furnace core tube made of silica therein, and the muffle tube 23 has heat resisting properties at the second treatment temperature, thus preventing occurrence of deformation and devitrification problems that could occur when the vitrification heating furnace 20 includes a furnace core tube made of silica. As a result, the decrease in the operation rate of the manufacturing apparatus 100 and the increase in the maintenance cost thereof can be prevented.

Additionally, as the size of the soot to be treated increases, the furnace core tube made of silica needs to have a larger size so as to accommodate the soot. The size increase markedly increases the cost. However, the vitrification heating furnace 20, which includes no furnace core tube made of silica therein, can prevent the cost increase caused when the size of the vitrification heating furnace 20 is increased.

Moreover, the inside of the vitrification heating furnace 20 can be kept airtight against the atmosphere when the soot 1 is guided into the vitrification heating furnace 20 and the optical fiber preform 2 is guided out of the vitrification heating furnace 20, thus preventing the atmosphere from being introduced to corrode and deteriorate the heaters 22, the muffle tube 23, and the heat insulating member. As a result, the decrease in the operation rate of the manufacturing apparatus 100 and the increase in the maintenance cost thereof can be prevented.

Figure 10:
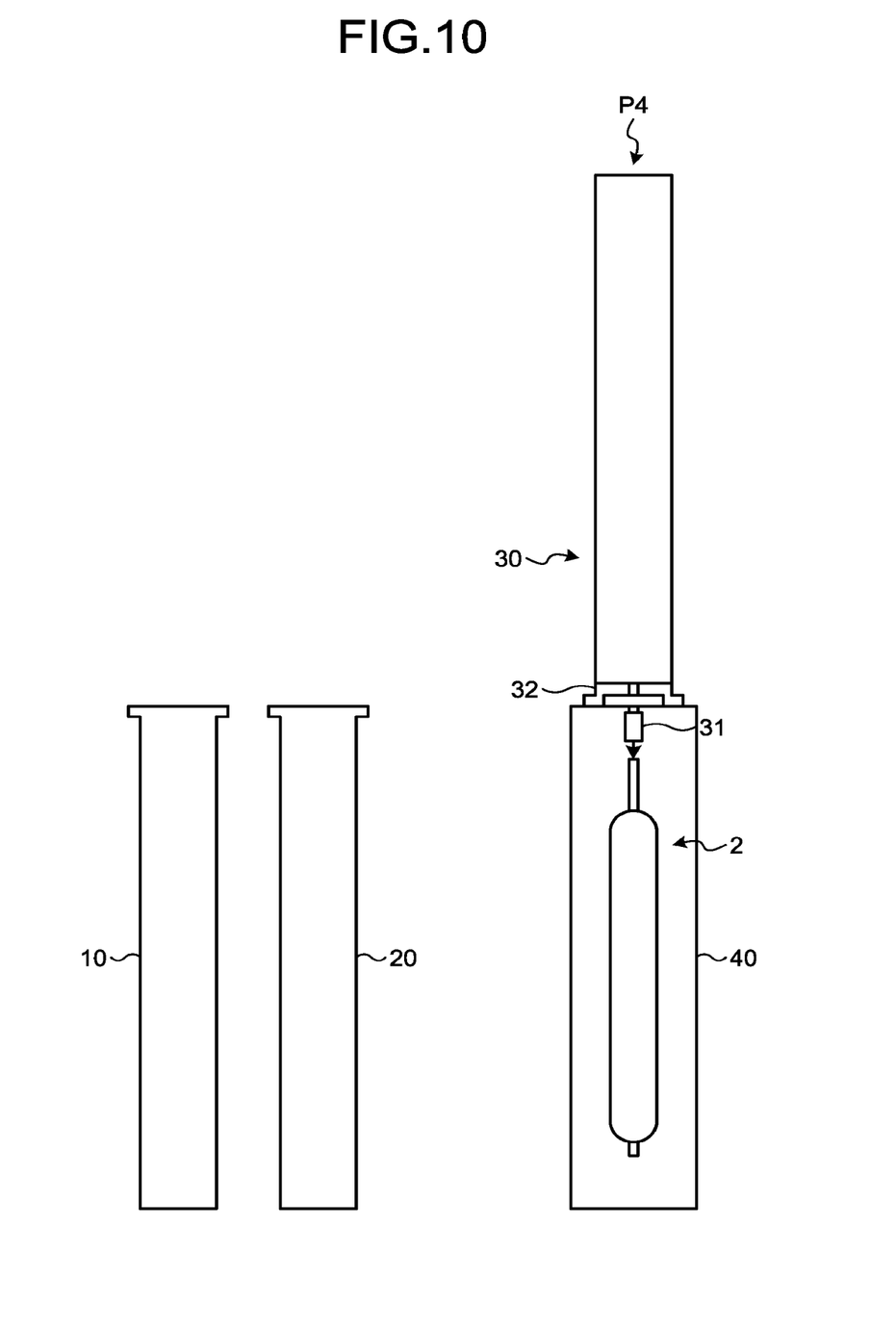
FIG. 10 is a schematic view illustrating the glass body manufacturing method.

After that, as illustrated in FIG. 10, the conveyance chamber 30 moves to the position P4, and the operating mechanism 31 lowers the optical fiber preform 2 to guide the optical fiber preform 2 into the storage 40.

Note that the structural body in the vitrification heating furnace, which is the muffle tube made of a carbon material in the above embodiment, may be a structural body made of any desired material, such as a ceramic material, that has heat resisting properties at the second treatment temperature. The structural body may be also a furnace core tube. When the structural body is a furnace core tube, the furnace core tube is positioned in the furnace body similarly to the furnace core tube in the dehydration heating furnace, and the muffle tube is separately positioned between the furnace core tube and the heaters. The heat insulating member is also positioned in the furnace body similarly to the heat insulating member in the dehydration heating furnace.

Additionally, although the optical fiber preform is manufactured as the glass body in the above embodiment, any desired glass body other than the optical fiber preform may be manufactured.

Furthermore, the above embodiment does not limit the present disclosure. The present disclosure encompasses a configuration obtained by combining the respective constituent elements described above as appropriate. A person skilled in the art can also easily conceive additional effects and modifications. Thus, a broader aspect of the present disclosure is not limited to the above embodiment, and various modifications may be made.

As described above, the glass body manufacturing apparatus, the glass body manufacturing method, the soot conveying mechanism, and the soot heating mechanism according to the present disclosure are useful for manufacturing the optical fiber preform.

The present disclosure can achieve the glass body manufacturing apparatus, the glass body manufacturing method, the soot conveying mechanism, and the soot heating mechanism capable of preventing a decrease in operation rate and an increase in maintenance cost.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A glass body manufacturing apparatus for manufacturing a glass body by dehydrating and transparently vitrifying a soot having a porous portion, the glass body manufacturing apparatus comprising:
   a first heating furnace including a furnace core tube accommodating the soot, and a first heater, the first heating furnace supplying a dehydration gas into the furnace core tube and heating the soot at a first treatment temperature, which is lower than a softening point of the porous portion, by the first heater;
   a second heating furnace including a structural body configured to accommodate the soot and a second heater, the second heating furnace heating the soot at a second treatment temperature, which is equal to or higher than the softening point, by the second heater; and
   a conveyance container connectable to each of the first heating furnace and the second heating furnace while keeping airtightness with respect to an outside atmosphere, the conveyance container being configured to accommodate and hold the soot, and convey the soot between the first heating furnace and the second heating furnace, wherein
   each of the first heating furnace, the second heating furnace, and the conveyance container comprises a respective shut-off mechanism which keeps airtightness for each of the first heating furnace, the second heating furnace, and the conveyance container with respect to the outside atmosphere, and the conveyance container is configured to move an operating mechanism with the soot into at least one of the first heating furnace and the second heating furnace.

2. The glass body manufacturing apparatus according to claim 1, wherein the structural body is positioned in a furnace body, and is made of a carbon material or a ceramic material.

3. The glass body manufacturing apparatus according to claim 1, wherein the structural body is a furnace core tube.

4. A glass body manufacturing method comprising:

in a first heating furnace, accommodating a soot having a porous portion in a furnace core tube made of glass, supplying a dehydration gas into the furnace core tube, and heating the soot at a first treatment temperature, which is lower than a softening point of the porous portion;

connecting a conveyance container and the first heating furnace together while keeping airtightness with respect to an outside atmosphere, accommodating and holding the soot in the conveyance container, and conveying the soot to the second heating furnace; and connecting the conveyance container and the second heating furnace together while keeping airtightness with respect to the outside atmosphere, accommodating the soot in a structural body of the second heating furnace, disconnecting the conveyance container from the second heating furnace while keeping airtightness with respect to the outside atmosphere, and heating the soot at a second treatment temperature, which is equal to or higher than the softening point.

5. A soot conveying mechanism to convey a soot between a first heating furnace and a second heating furnace, the soot conveying mechanism comprising:

a conveyance container accommodating the soot; and a moving mechanism moving the conveyance container to a position above the first heating furnace and to a position above the second heating furnace, wherein the conveyance container includes:

an operating mechanism capable of lifting and lowering the soot an airtight mechanism capable of making an inside of the conveyance container airtight, and a connection unit configured to be connectable to the first heating furnace or the second heating furnace, the conveyance container is configured to move the operating mechanism into the first heating furnace with the soot when the soot is heated by the first heating furnace, and the conveyance container is configured to move the operating mechanism into the second heating furnace with the soot when the soot is heated by the second heating furnace.

6. The soot conveying mechanism according to claim 5, further comprising a rotating mechanism erecting the soot such that opposite ends of a glass rod in the soot are positioned in top and bottom.

7. A soot heating mechanism to convert a soot having a porous portion into a fiber preform, the soot heating mechanism comprising:

a first heating furnace including a furnace core tube accommodating the soot, a first heater, a first gas supply unit supplying a dehydration gas into the furnace core tube, and a first gas discharge unit discharging the dehydration gas, the first heating furnace heating the soot at a first treatment temperature, which is lower than a softening point of the porous portion, by the first heater under an atmosphere of the dehydration gas; and a second heating furnace including a structural body configured to accommodate the soot, a second heater, a second gas supply unit supplying an inert gas into the structural body, and a second gas discharge unit discharging the inert gas, the second heating furnace heating the soot at a second treatment temperature, which is equal to or higher than the softening point, by the second heater under an atmosphere of the inert gas, wherein each of the first heating furnace and the second heating furnace comprises a shut-off mechanism which keeps airtightness of the respective heating furnace with respect to an outside atmosphere.

* * * * *